US010286546B2

(12) United States Patent
Niedermeier

(10) Patent No.: US 10,286,546 B2
(45) Date of Patent: May 14, 2019

(54) ROBOT SYSTEM

(71) Applicant: Yaskawa Europe GmbH, Allershausen (DE)

(72) Inventor: Josef Niedermeier, Halmhausen (DE)

(73) Assignee: Yaskawa Europe GmbH, Allershausen (DE)

(*) Notice: Subject to any disclaimer, the term of this patent is extended or adjusted under 35 U.S.C. 154(b) by 249 days.

(21) Appl. No.: 15/127,449

(22) PCT Filed: Mar. 19, 2015

(86) PCT No.: PCT/EP2015/000605
§ 371 (c)(1),
(2) Date: Sep. 20, 2016

(87) PCT Pub. No.: WO2015/139841
PCT Pub. Date: Sep. 24, 2015

(65) Prior Publication Data
US 2018/0169853 A1 Jun. 21, 2018

(30) Foreign Application Priority Data
Mar. 20, 2014 (DE) .................. 10 2014 004 075

(51) Int. Cl.
*B25J 9/00* (2006.01)
*B23K 37/00* (2006.01)
(Continued)

(52) U.S. Cl.
CPC ........... *B25J 9/0084* (2013.01); *B23K 37/006* (2013.01); *B23K 37/047* (2013.01); *B25J 9/0096* (2013.01); *G05B 19/19* (2013.01)

(58) Field of Classification Search
CPC ..... B25J 9/0084; B25J 9/0096; B23K 37/006; B23K 37/047; G05B 19/19; B23B 3/167;
(Continued)

(56) References Cited

U.S. PATENT DOCUMENTS 4,949,444 A * 8/1990 Kojima ................ B23B 3/06
29/27 R
5,337,938 A 8/1994 Gilbert
(Continued)

FOREIGN PATENT DOCUMENTS

DE          199 04 422 A1     3/2000
DE      10 2005 019688 A1    10/2006
(Continued)

OTHER PUBLICATIONS

Caro et al., Workpiece placement optimization for machining operations with industrial robots, 2014, IEEE, p. 1716-1721 (Year: 2014).*
(Continued)

*Primary Examiner* — McDieunel Marc
(74) *Attorney, Agent, or Firm* — Dilworth & Barrese, LLP

(57) ABSTRACT

A method of machining workpieces using a device (1) which has a rotating frame (4), at least two robots (3) which are provided at the rotating frame (4), and at least one first and one second workpiece positioner (2) which are provided at the rotating frame (4), wherein the method comprises the following steps: placing at least one first workpiece into a first workpiece positioner (2); and machining the first workpiece by the robot or robots (3) and simultaneously rotating the rotating frame (4).

18 Claims, 6 Drawing Sheets

(51) Int. Cl.
  *B23K 37/047* (2006.01)
  *G05B 19/19* (2006.01)
(58) Field of Classification Search
  CPC .. B23B 3/06; B23Q 3/18; B23Q 7/045; B23Q 7/047; B23F 23/04
  See application file for complete search history.

(56) References Cited

U.S. PATENT DOCUMENTS

| | | | | |
|---|---|---|---|---|
| 5,758,554 | A * | 6/1998 | Miyano | B23B 3/167 82/1.11 |
| 5,873,569 | A * | 2/1999 | Boyd | B23Q 3/18 269/296 |
| 5,910,041 | A * | 6/1999 | Duescher | B24B 37/042 451/28 |
| 5,967,882 | A * | 10/1999 | Duescher | B24B 37/042 451/262 |
| 6,048,254 | A * | 4/2000 | Duescher | B24B 37/042 451/28 |
| 6,120,352 | A * | 9/2000 | Duescher | B24B 37/042 451/287 |
| 6,264,418 | B1 * | 7/2001 | Michael | B23K 37/047 198/468.6 |
| 6,357,994 | B1 * | 3/2002 | St. Onge | B23F 23/04 198/468.2 |
| 7,103,955 | B2 * | 9/2006 | Murai | B23Q 7/045 29/418 |
| 8,210,418 | B1 | 7/2012 | Landoll et al. | |
| 2005/0161446 | A1 * | 7/2005 | Fuson | B23K 15/0046 219/121.82 |
| 2009/0212090 | A1 | 8/2009 | Hepp et al. | |
| 2009/0248201 | A1 | 10/2009 | Habisreitinger | |
| 2011/0200406 | A1 * | 8/2011 | Lang | B23Q 7/047 483/31 |
| 2018/0169853 | A1 * | 6/2018 | Niedermeier | B25J 9/0084 |

FOREIGN PATENT DOCUMENTS

| | | |
|---|---|---|
| DE | 10 2006 026 134 A1 | 6/2007 |
| DE | 20 2009 018 754 U1 | 3/2013 |
| EP | 1 375 088 A1 | 1/2004 |
| JP | 10-15856 A1 | 1/1998 |
| WO | 2011/055225 A1 | 5/2011 |

OTHER PUBLICATIONS

Guo et al., A concentric robot gripper with one-degree-of-freedom for cylindrical workpieces, 1992, IEEE, p. 1-2 (Year: 1992).*
Caro et al., Workpiece placement optimization for machining operations with a KUKA KR270-2 robot, 2013, IEEE, p. 2921-2926 (Year: 2013).*
Liu et al., A calibration method of workpiece frames for ultrasonic testing using twin-robot, 2016, IEEE, p. 66-70 (Year: 2016).*
Reinhart et al., A Generic Framework for Workpiece-based Programming of Cooperating Industrial Robots, 2009, IEEE, p. 37-42 (Year: 2009).*
Lee et al., Development of Multi-Axis Gantry Type Welding Robot System Using a PC-Based Controller, 2001, IEEE, p. 1536-1541 (Year: 2001).*
"Motoman—Experts in Automation," Aug. 2009, 5 pages.
Motoman 2-station positioner, Sep. 2007, 2 pages.

* cited by examiner

ROBOT SYSTEM

BACKGROUND OF THE INVENTION

The present invention relates to a method of machining workpieces comprising a device which has a rotating frame, at least two robots which are provided at the rotating frame, and at least one first and one second workpiece positioner which are provided at the rotating frame. The invention furthermore relates to a device for carrying out this method.

Robots are used for carrying out the most varied of work such as cutting or welding workpieces, positioning workpieces or, for example, painting components. It is customary in this respect to use the robots in cooperation with peripheral units such as workpiece positioners or safety gates. Workpiece positioners are used in this respect to position the workpieces optimally relative to the robot or robots. The workpiece or workpieces are typically releasably fastened to the workpiece positioners. The workpiece or workpieces are fastened to the workpiece positioner for machining with the robot.

Safety gates are necessary when persons have access to a robot deployment zone for the purpose of changing workpieces, for example. In order not to endanger the personnel by the deployment of robots, it is customary or necessary to effect a separation between robots and personnel by said safety gates or safety zones and/or a shutting down of the robots on an intrusion into the safety zone.

The problem results in this respect that a robot cannot carry out any work at a workpiece when a person is present in a safety zone. The machining time of the workpiece is hereby disadvantageously extended. In accordance with the prior art, it is admittedly known, for example, to accelerate the routines of the robot movement or of the movements of the workpiece positioners in order thus to keep the machining times of the workpieces low.

However, an acceleration of the routines causes a substantial additional construction effort in the configuration of the components. In this respect, both correspondingly powerful and simultaneously precise support structures, drives, transmissions, and matching control devices have to be provided, which represents a considerable and problematic cost factor.

A device for machining workpieces is known from DE 20 2009 018 754 U1 which has a rotating frame, a plurality of robots and a plurality of workpiece positioners. The robots are, however, fixedly connected to the floor.

WO 2011/055225 A1 discloses a device having a rotating frame, a robot, and a plurality of workpiece positioners.

A device for machining workpieces is known from U.S. Pat. No. 8,210,418 B1.

SUMMARY OF THE INVENTION

It is the object of the present invention to provide an improved method for carrying out robot work which does not make any compromises in the machining times and which can be produced in a simplified and less expensive manner in comparison with the methods known from the prior art.

This object is achieved in accordance with the invention by a method having the features herein. Advantageous further developments are the subject of the dependent claims.

The method in accordance with the invention for machining workpieces comprises a device which has a rotating frame, at least two robots which are provided at the rotating frame and at least one first and one second workpiece positioner which are provided at the rotating frame. The robots and the workpiece positioners are rotated together with the rotating frame. The method in this respect comprises the steps:

placing at least one first workpiece into a first workpiece positioner; and machining the first workpiece by the robots and simultaneous rotation of the rotating frame.

It is possible through a common arrangement of the robots and of the workpiece positioners at the rotating frame to provide a method which is also suitable to carry out robot work when the rotating frame rotates between different positions. Since the components of the unit of robots and workpiece positioners, and thus also a workpiece positioned at the workpiece positioner are fixed relative to one another via the rotating frame, no relative movements between the robots and the workpiece which are disadvantageous for the robot work occur during the rotation of the rotating frame and of the further components provided thereat.

The robots and the workpiece positioners are thus provided, in particular installed, on the rotating frame, which is movable or rotating, such that they are also moved or rotated during the movement or rotation of the rotating frame. The relative position of the robots with respect to the machining stations or workpiece positioners or the respective workpiece is thus always the same. The robots can thus also work precisely during the rotation of the rotating frame at the machining stations. The accuracy of the work of the robots is independent of a basic drive of the rotating frame and its control, and precision. The accuracy of the robot work also remains unaffected or almost unaffected in the event of an uneven load distribution over the rotating frame, that is, when, for example, the total frame tilts or wobbles.

It is conceivable in a preferred embodiment that the method furthermore comprises the further step:

placing at least one second workpiece into the second workpiece positioner.

The simultaneous loading of a further workpiece positioner and optionally of further workpiece positioners with workpieces allows a beneficial reduction of the downtime when carrying out the method. If the machining of the first workpiece on the first workpiece positioner is completed, the robots can seamlessly move on in accordance with the method to the machining of further workpieces on the further workpiece positioner or workpiece positioners. It is thus conceivable in a further preferred embodiment that the method furthermore comprises the step:

machining the second workpiece by the robots and simultaneous rotation of the rotating frame.

It is conceivable in further preferred embodiments that the method comprises the steps:

removing the first workpiece from the first workpiece positioner; and/or placing at least one third workpiece into the first workpiece positioner.

It is thus possible to use the at least two workpiece positioners alternately for machining workpieces and advantageously to eliminate downtimes of the robots completely or almost completely.

It is conceivable in a further embodiment that the machining of the workpiece or workpieces comprises welding work. The method in accordance with the invention can be used particularly advantageously for welding work.

The underlying object of the invention is furthermore achieved by a device having the features herein. The present invention accordingly relates to a device for carrying out the method in accordance with the invention comprising a rotating frame, at least two robots which are provided at the rotating frame, and at least two workpiece positioners which are provided at the rotating frame. The robots can be rotated together with the rotating frame.

It is conceivable in a further preferred embodiment that the rotating frame, the robots, and the workpiece positioners are arranged within a safety zone of the device and are configured not to leave the safety zone in normal operation. The safety zone is therefore configured such that the rotating frame, the robots, and the workpiece positioners are arranged within the safety zone in normal operation.

A safe and simplified embodiment of the invention is hereby made possible. The safety zone can in this respect, for example, comprise a fencing and/or a sensor unit by means of which it is ensured that no personnel can intrude into the safety zone or that the device carries out an emergency stop when personnel intrude into the safety zone. The term normal operation in this respect means that it is the normal robot working operation for machining workpieces and not, for example, the operation required for installing or for servicing the device.

It is conceivable in a further preferred embodiment that the safety zone comprises a workpiece changing region, preferably a workpiece changing and teaching region, in which the workpiece changing, preferably both the workpiece changing and the teaching of robots, can be carried out.

It is meant by this that the same undivided region can be used for the workpiece changing and preferably also for teaching the robots. It is hereby advantageously not necessary to provide a separate, i.e. discrete, space for programming or teaching the robots since this can take place in the insertion region or in the workpiece changing and teaching region.

The number of the gates required for demarcating or entering the safety zone can further advantageously be reduced by the combination of workpiece changing and teaching region with cost advantages. The total space requirements of the device are likewise reduced since the necessity of an additional programming region differing from the workpiece changing region is omitted.

It is conceivable in a further preferred embodiment that the rotating frame is an H frame and/or that a respective welding protector at least partly surrounds the robots. The robots can thereby be arranged particularly suitably relative to the workpiece or workpieces on a middle region of the frame, which is in particular of H shape, for carrying out the robot work.

The welding protector can be co-rotatable with the robot. It can be immobile relative to the robot or relative to a vertically rotatable section of the robot so that it is co-rotated on a rotation of the robot. Since the robots of the device are configured also to carry out robot work during a rotation of the rotating frame, it is possible with such a welding protector also to screen welding work effectively when it takes place during a rotation of the device.

In accordance with another advantageous further development, the robots are arranged symmetrically to the axis of rotation of the rotating frame. A weight compensation can hereby be provided. The device in accordance with the invention can thereby be stabilized.

The present invention is not only suitable for robots for carrying out welding work, but also for carrying out all robot work in which the problems of workpiece changing are analogously present.

BRIEF DESCRIPTION OF THE DRAWINGS

An embodiment of the invention will be explained in detail in the following with reference to the enclosed drawing: There are shown in the drawing FIG. 1 a perspective view of a device in accordance with the invention.

DESCRIPTION OF THE PREFERRED EMBODIMENTS

Figure 1:
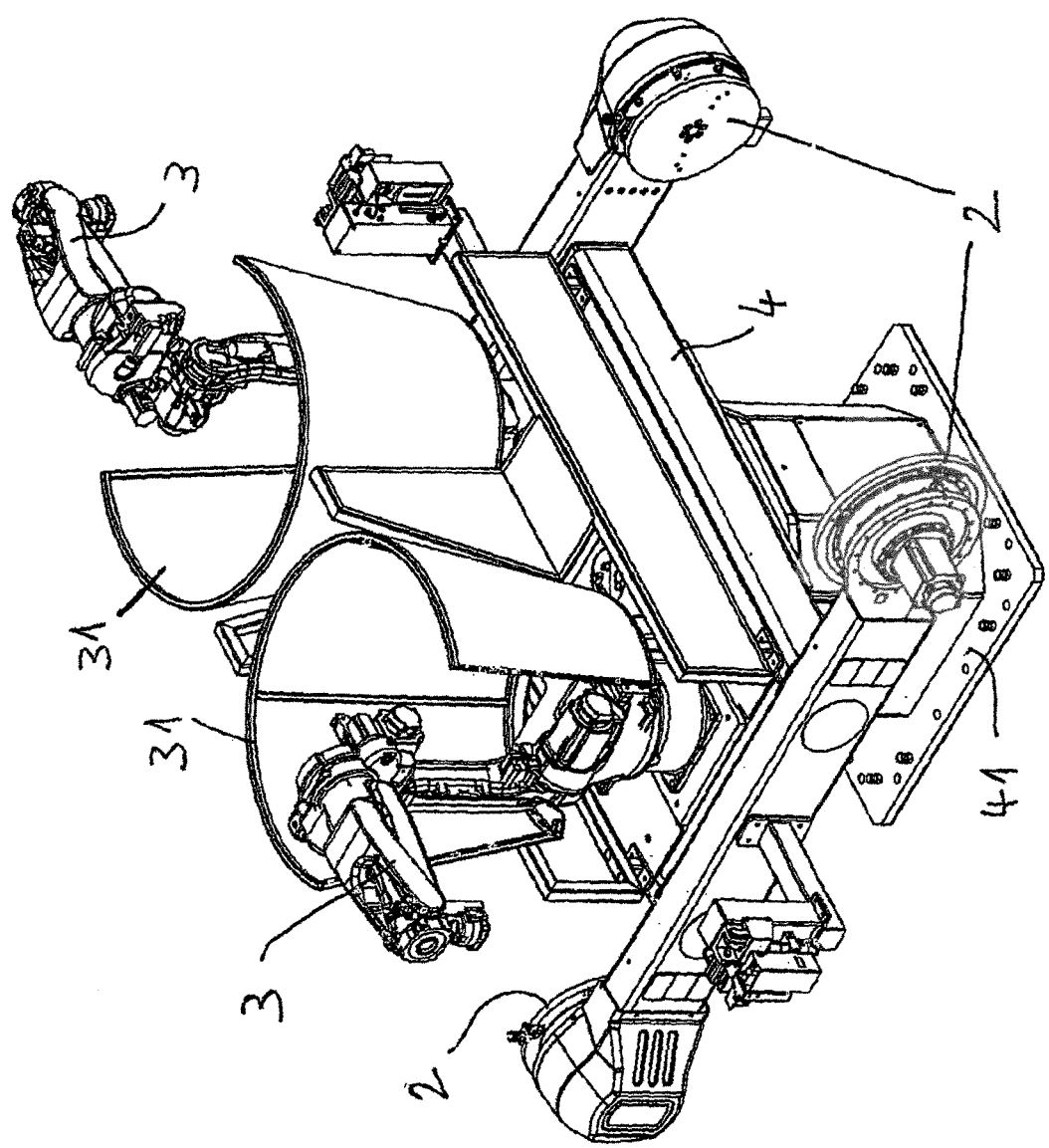

FIG. 1 shows a device 1 for carrying out a method of placing at least one workpiece into at least one workpiece positioner 2 and of machining the workpiece by at least one robot 3. The device shown in FIG. 1 is suitable for carrying out the method in accordance with the invention.

A rotating frame 4 is provided in the device 1 and is connected pivotably or rotatably about a vertical axis via a flange region 41 to a base section, for example to a hall floor within a factory workshop. In the shown embodiment of FIG. 1, two robots 3 for machining workpieces, not shown, are provided on the rotating frame 4. The robots 3 are in this respect connected to the rotating frame 4 such that they are pivotable together with it about the vertical pivot axis of the rotating frame 4. The robots 3 can additionally be moved about their own pivot axes. In this respect, an anchorage of the rotating frame 4 at a ceiling region of a production hall is, for example, conceivable such that the device 1 can be provided in a suspended manner.

Two workpiece positioners 2 can furthermore be recognized in FIG. 1. Each of the two workpiece positioners 2 comprises two mutually oppositely disposed parts which each comprise a fastening plate. The workpiece not shown in the drawing is releasably fastened between these two mutually oppositely disposed fastening plates. Three of a total of four fastening plates of the workpiece positioners 2 can be recognized in FIG. 1. The fastening plates of the workpiece positioners 2 are connected to the rotating frame 4. Like the robots 3, the workpiece positioners 2 can also be pivoted together with the rotating frame 4 about its vertical pivot axis. This arrangement of rotating frame 4, robots 3, and workpiece positioners 2 makes it possible to carry out robot work at workpieces positioned and firmly held by the workpiece positioners 2 during the pivoting of the rotating frame 4.

The rotating frame 4 is configured as an H frame in the embodiment shown, which allows a particularly advantageous arrangement of, for example, the fastening plates of the workpiece positioners 2 at the end points of the H frame. It is simultaneously possible to arrange a plurality of robots 3 in the central region of the H frame such that the robots 3 have easy access to the workpieces positioned by the workpiece positioners 2.

A respective welding protector 31 is provided about the robots 3 in the embodiment of FIG. 1. A corresponding protection from UV radiation can thus be ensured in the case that the robots 3 are welding robots. It is conceivable in this respect that the welding protector 31 is respectively connected to the corresponding robot 3 such that it is likewise co-rotated on the pivoting of the robot 3 about its vertical axis. It is hereby prevented, for example, that the freedom of movement of a robot 3 is restricted by the welding protector 31 associated with it and can, for example, not machine all the workpieces associated with it.

Figure 2:
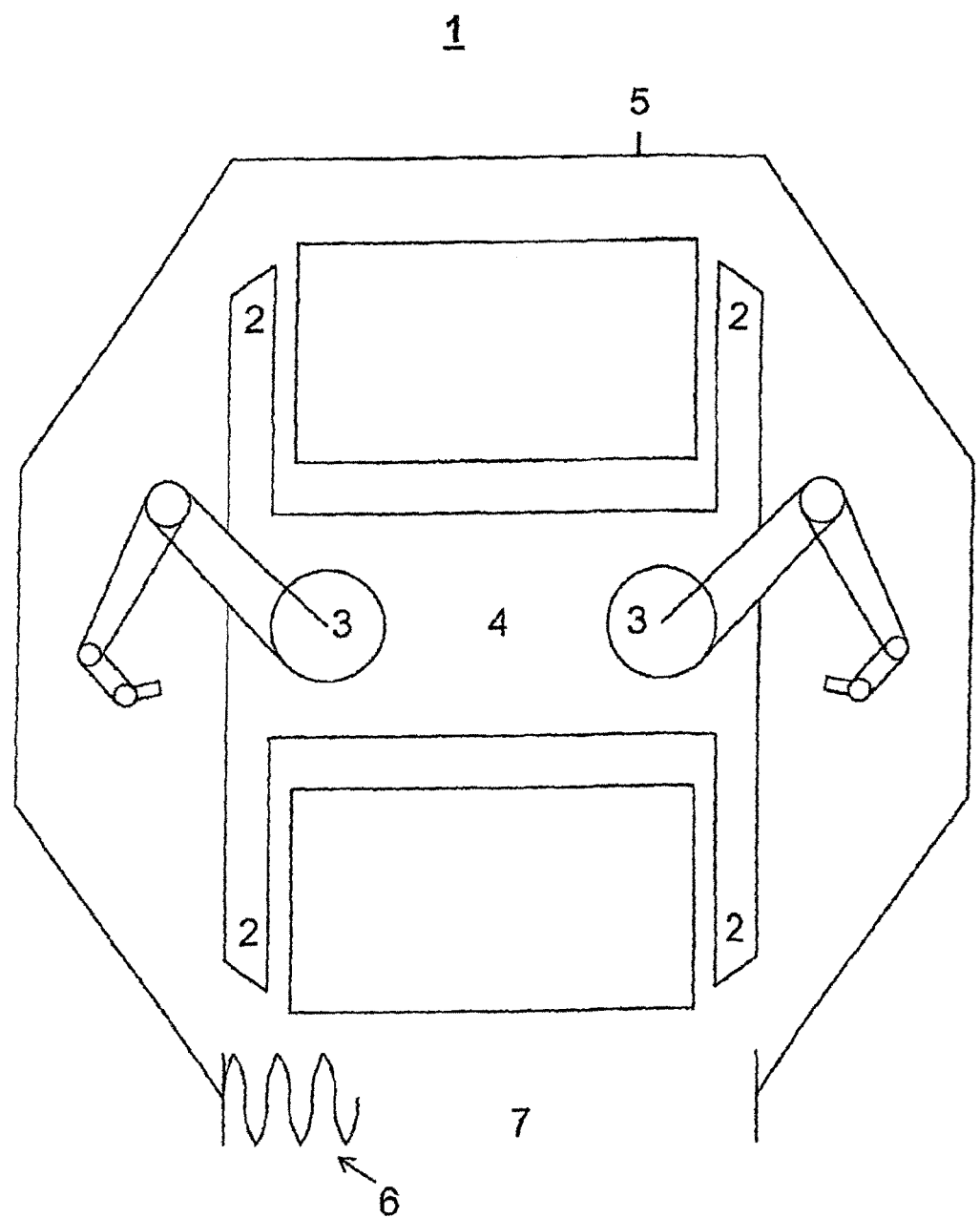
FIG. 2 the device in accordance with FIG. 1 in a schematic view from above in a first working position.

FIG. 2 shows a schematic plan view of the device 1. The device 1 is in this respect in a first position 1 in which the rotation of the rotating frame 4 is 40°. The device 1 is arranged in a safety zone 5. In a normal operation, that is in an operation in which the device carries out the machining of the workpiece or workpieces, the entire device 1 is located within the safety zone 5. A barrier or an access gate 6 is shown open in a front region of the safety zone 5. Operating personnel can access the device 1 in the open state of the barrier 6. This can, for example, be necessary for the purpose of a workpiece change or to carry out teaching work at a robot or at both robots.

At least one first workpiece positioner 2 is located in the workpiece changing and teaching region 7 in the position 1 of FIG. 2. It is thereby possible for the operating personnel to remove a completely machined workpiece from the safety zone 5 and subsequently to position a workpiece to be machined in the workpiece positioner 2. The robots 3 in this respect do not carry out any work in the workpiece changing and teaching region 7 so as not to endanger the operating personnel unnecessarily. It is, however, conceivable that the robots 3 carry out work at another workpiece or at other workpieces in a region remote from the workpiece changing and teaching region 7. It is furthermore conceivable in the position 1 shown in FIG. 2 to carry out teaching work at the robots 3, that is to carry out the programming of new work procedures.

Figure 3:
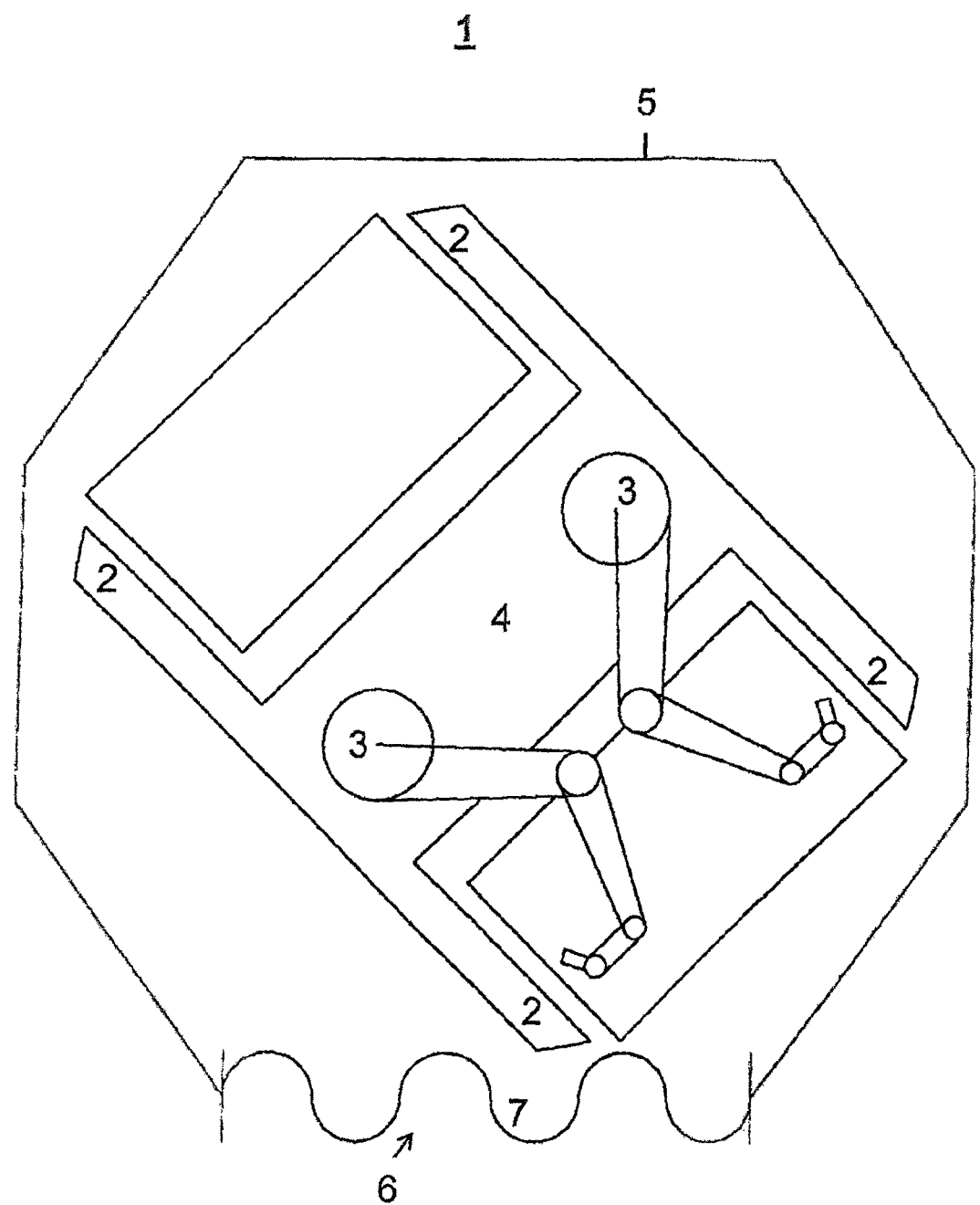
FIG. 3 the device in accordance with FIGS. 1 and 2 in a further working position.

A position 2 of the device 1 is shown in FIG. 3 in which the rotating frame 4 is rotated by 45° counter-clockwise. The barrier 6 is closed and the robots 3 carry out work at one or more workpieces. The machining can in this respect take place from that point in time from which the barrier 6 is closed and thus there are no longer any personnel in the workpiece changing and teaching region 7.

Figure 4:
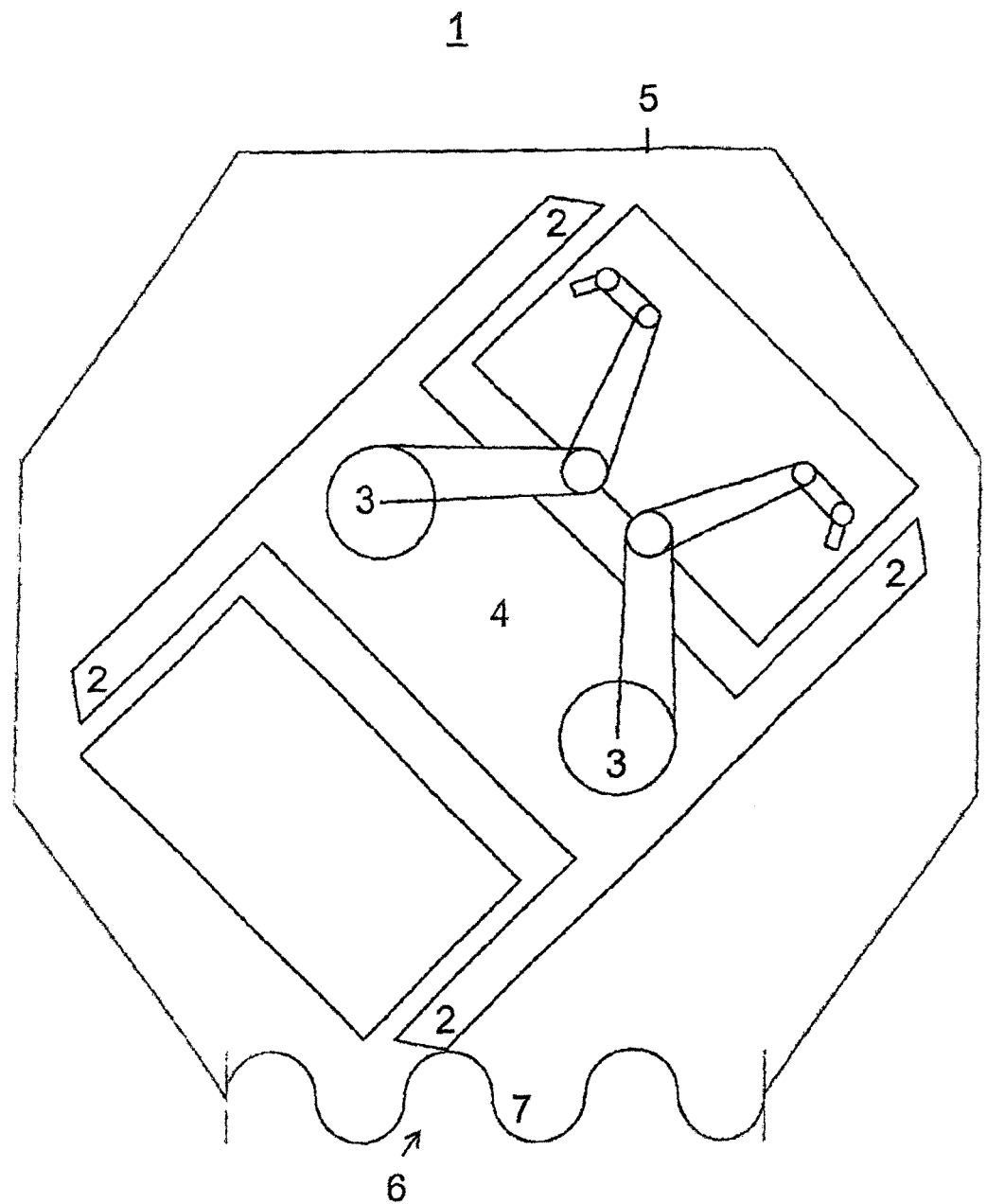
FIG. 4 the device in accordance with FIGS. 1-3 in a further working position.

FIG. 4 shows a position 3 of the device 1 in which the rotating frame 4 is rotated by 135° counter-clockwise and in which, as in position 2, workpieces are also machined by the robots 3 during the rotating procedure of the rotating frame 4. In this respect, at least one second workpiece positioner 2 arranged opposite the first workpiece positioner 2 approaches the workpiece changing and teaching region 7. At least one completed workpiece can in this respect be positioned in at least one second workpiece positioner 2.

Figure 5:
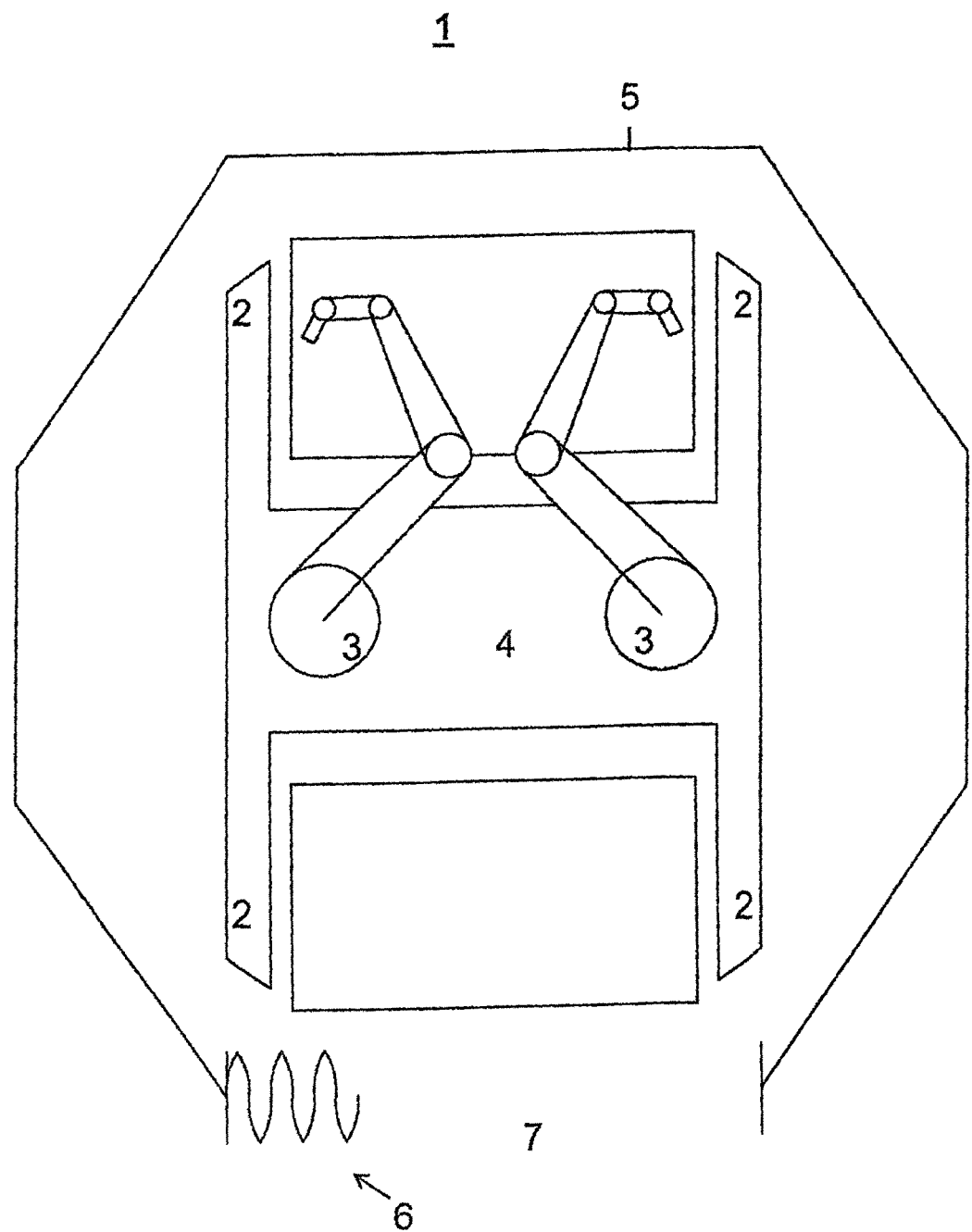
FIG. 5 the device in accordance with FIGS. 1-4 in a further working position.

FIG. 5 shows a position 4 in which the rotating frame 4 is pivoted by 180° in comparison with position 1. The first workpiece positioner 2 at which robot work is still being carried out has thus moved as far away as possible from the workpiece changing and teaching region 7. The second workpiece positioner 2 is located in the tool changing and teaching region 7 for this purpose. The barrier 6 can now be opened analog to position 1. Operating personnel can thus carry out a workpiece change. It is not necessary in this respect to stop the robot work at the other workpiece since said robot work can be continued in a region spaced apart from the workpiece changing and teaching region 7.

Figure 6:
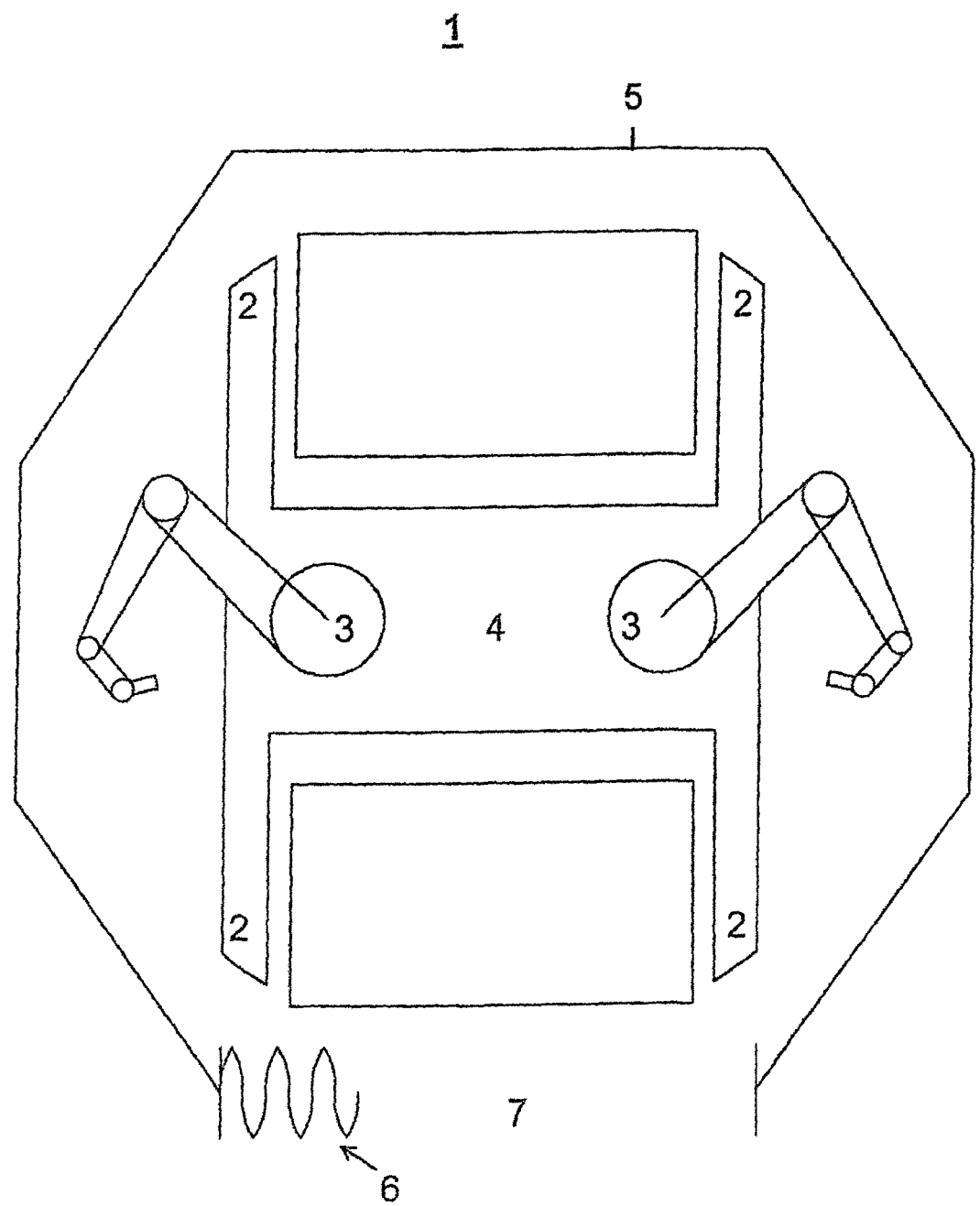
FIG. 6 the device in accordance with FIGS. 1-5 in a further working position.

FIG. 6 shows a position 5 in which the rotating frame 4 is rotated, as in position 4, about 180° relative to the position 1. The robots 3 are in a neutral position. Workpiece changing and/or teaching work can be carried out by personnel in the workpiece changing and teaching region 7.

The rotating frame 4 can first be rotated by 180° in one direction and subsequently by a further 180° in the same direction. It is, however, also possible first to rotate the rotating frame 4 by 180° in one direction and subsequently by 180° in the opposite direction.

As can be seen from FIG. 1, each welding protector 31 is connected to the associated robot 3. It is fastened to a part of the robot 3 which rotates about a vertical axis. The welding protector 31 extends upwardly in a cylindrical or funnel-like manner, with the funnel preferably expanding upwardly. In this respect, the welding protector 31 preferably extends over an angular range of more than 180°. The height of the welding protector 31 is adapted to the working zone of the robot. It can be lower, just as high or higher than the highest working position of the tool, in particular of the welding tool, of the robot.

The invention claimed is:

1. A method of machining workpieces using a device (1) which has a rotating frame (4), at least a first and a second robot (3) which are provided on the rotating frame (4), and a first and a second workpiece positioner (2) also provided on the rotating frame (4), comprising the steps of:
   placing at least one first workpiece into a first workpiece positioner (2) at a workpiece receiving positon;
   rotating the frame (4) together with the first workpiece positioner (2) and robots (3) mounted upon the frame (4); and
   machining the first workpiece by the first and second robots (3) as the rotating frame (4) simultaneously rotates away from the workpiece receiving position.

2. A method in accordance with claim 1, comprising the further step of:
   placing at least one second workpiece into the second workpiece positioner (2).

3. A method in accordance with claim 2, comprising the further step of:
   machining the second workpiece by the robots (3) and simultaneously rotating the rotating frame (4).

4. A method in accordance with claim 1, comprising the further step of:
   removing the first workpiece from the first workpiece positioner (2).

5. A method in accordance with claim 4, comprising the further step of:
   placing at least one third workpiece into the first workpiece positioner (2).

6. A method in accordance with claim 1, wherein the machining of the workpiece or workpieces comprises welding work.

7. A method in accordance with claim 1, wherein the first robot (3) comprises a first robot base connected to the rotating frame (4) and a first welding protector (31) partly surrounding the first robot (3), and the second robot (3) comprises a second robot base connected to the rotating frame (4) and a second welding protector (31) partly surrounding the second robot (3), the method further comprising the steps of:
   rotating the first robot (3) with respect to the first robot base connected to the rotating frame (4) and co-rotating the first welding protector (31) together with the first robot (3) with respect to the first robot base, and
   rotating the second robot (3) with respect to the second robot base connected to the rotating frame (4) and co-rotating the second welding protector (31) together with the second robot (3) with respect to the second robot base.

8. A method in accordance with claim 1, additionally comprising
removing the thus-machined first workpiece from the first workpiece positioner (2) while a second workpiece is being machined by the first and second robots (3) at the second work piece positioner (2).

9. A device (1) for machining a workpiece, comprising
a rotating frame (4), at least a first and a second robot (3) which are mounted upon the rotating frame (4), and
at least two workpiece positioners (2) which are provided on the rotating frame (4),
with the workpiece positioners (2) each configured to receive a workpiece for machining at a workpiece receiving position, the first and second robots (3) configured to machine the workpiece as the frame (4) simultaneously rotates away from the workpiece receiving position.

10. A device (1) in accordance with claim 9, wherein the rotating frame (4), the robots (3) and the workpiece positioners (2) are arranged within the safety zone (5) of the device (1) and are configured not to leave the safety zone (5) in normal operation.

11. A device (1) in accordance with claim 10, wherein the safety zone (5) comprises a workpiece changing region, preferably a workpiece changing and teaching region (7), in which the workpiece changing, preferably both the workpiece changing and the teaching of robots (3), can be carried out.

12. A device (1) in accordance with claim 9, wherein the rotating frame (4) is an H frame.

13. A device (1) in accordance with claim 9, wherein a respective welding protector (31) at least partly surrounds the robots (3).

14. A device (1) in accordance with claim 9, wherein the robots (3) are arranged symmetrically with respect to the axis of rotation of the rotating frame (4).

15. A device in accordance with claim 9, wherein the first robot (3) comprises a first robot base connected to the rotating frame (4) and a first welding protector (31) partly surrounding the first robot (3), and the second robot (3) comprises a second robot base connected to the rotating frame (4) and a second welding protector (31) partly surrounding the second robot (3),
wherein the first robot (3) is arranged to rotate with respect to the first robot base connected to the rotating frame (4) and the first welding protector (31) is arranged to rotated together with the first robot (3) with respect to the first robot base, and
the second robot (3) is arranged to rotate with respect to the second robot base connected to the rotating frame (4) and the second welding protector (31) is arranged to rotate together with the second robot (3) with respect to the second robot base.

16. A device in accordance with claim 9, additionally comprising a safety zone (5) in which the device (1) is entirely positioned and a barrier surrounding the safety zone (5) and having an access gate (6) openable and closeable at a front region of the safety zone (5).

17. A device in accordance with claim 9, wherein the rotating frame (4) is suspended from a ceiling.

18. A device in accordance with claim 9, wherein the rotating frame (4) is configured as an H-frame defining the first and second workpiece positioners (2) and the first and second robots (3) are arranged at a central position on the H-frame.

* * * * *